(12) United States Patent
Dry et al.

(10) Patent No.: US 10,926,733 B2
(45) Date of Patent: Feb. 23, 2021

(54) VEHICLE INCLUDING INFLATABLE ASSEMBLY SUPPORTED BY SEAT

(71) Applicant: Ford Global Technologies, LLC, Dearborn, MI (US)

(72) Inventors: Alan George Dry, Grosse Pointe Woods, MI (US); Brian Spahn, Plymouth, MI (US); Benjamin Yilma, Canton, MI (US); Johnathan Line, Northville, MI (US); S. M. Akbar Berry, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 16/242,452

(22) Filed: Jan. 8, 2019

(65) Prior Publication Data

US 2019/0275979 A1  Sep. 12, 2019

Related U.S. Application Data

(60) Provisional application No. 62/641,617, filed on Mar. 12, 2018.

(51) Int. Cl.
| | | |
|---|---|---|
| *B60R 21/231* | (2011.01) | |
| *B60R 21/2338* | (2011.01) | |
| *B60R 21/207* | (2006.01) | |
| *B60R 21/01* | (2006.01) | |

(52) U.S. Cl.
CPC ...... *B60R 21/23138* (2013.01); *B60R 21/207* (2013.01); *B60R 21/2338* (2013.01); *B60R 2021/01027* (2013.01); *B60R 2021/23146* (2013.01); *B60R 2021/23386* (2013.01)

(58) Field of Classification Search
CPC .......... B60R 21/23138; B60R 21/2338; B60R 21/207; B60R 2021/01027; B60R 2021/23146; B60R 2021/23386; B60R 2021/23161; B60R 21/231; B60R 21/015; B60R 2021/0032; B60N 2/3011
See application file for complete search history.

(56) References Cited

U.S. PATENT DOCUMENTS

| | | | | | |
|---|---|---|---|---|---|
| 2,873,122 | A | * | 2/1959 | Peras | ...................... B60R 21/02 280/29 |
| 3,218,103 | A | * | 11/1965 | Boyce | ..................... B60R 21/16 297/466 |

(Continued)

FOREIGN PATENT DOCUMENTS

| | | |
|---|---|---|
| DE | 19859988 B4 | 6/2010 |
| DE | 102014004185 A1 | 9/2015 |

(Continued)

*Primary Examiner* — Paul N Dickson
*Assistant Examiner* — Timothy Wilhelm
(74) *Attorney, Agent, or Firm* — Frank A. MacKenzie; Bejin Bieneman PLC (57) ABSTRACT

A vehicle seat assembly includes a seatback including a left lateral panel and a right lateral panel opposite the left lateral panel, a left airbag inflatable from the left lateral panel to an inflated position, a right airbag inflatable from the right lateral panel to an inflated position, a tether extending from the left lateral panel to the right lateral panel, and a sheet connected to the left airbag and the right airbag. The tether is connected to the left and right airbags.

17 Claims, 6 Drawing Sheets

(56) References Cited

U.S. PATENT DOCUMENTS

| | | | | |
|---|---|---|---|---|
| 3,623,768 | A * | 11/1971 | Capener | B60R 21/207 297/330 |
| 3,692,327 | A * | 9/1972 | Barrick, Sr. | B60R 21/08 280/749 |
| 3,722,951 | A * | 3/1973 | Ezquerra | B60R 21/02 297/488 |
| 3,753,576 | A * | 8/1973 | Gorman | B60R 21/207 280/730.1 |
| 3,827,716 | A * | 8/1974 | Vaughn | A41D 13/018 280/730.1 |
| 3,837,670 | A * | 9/1974 | Hilyard | B60R 21/02 280/753 |
| 3,953,049 | A * | 4/1976 | Surace | B60R 21/08 280/730.1 |
| 4,081,156 | A * | 3/1978 | Ideskar | B64D 25/02 244/122 AG |
| 4,215,835 | A * | 8/1980 | Wedgwood | B64D 25/02 244/122 AG |
| 4,359,200 | A * | 11/1982 | Brevard | B64D 25/06 244/122 AG |
| 4,436,262 | A * | 3/1984 | Cummings | B64D 25/10 244/122 AG |
| 4,440,443 | A * | 4/1984 | Nordskog | A47C 7/38 297/397 |
| 4,508,294 | A * | 4/1985 | Lorch | B64D 25/02 244/122 AG |
| 4,592,523 | A * | 6/1986 | Herndon | B64D 25/02 244/122 AG |
| 4,667,902 | A * | 5/1987 | Zenobi | B64D 25/02 244/122 A |
| 4,749,153 | A * | 6/1988 | Herndon | B64D 25/10 244/122 A |
| 5,232,243 | A * | 8/1993 | Blackburn | B60N 2/002 177/144 |
| 5,301,903 | A * | 4/1994 | Aronne | B64D 25/02 244/122 AG |
| 5,464,246 | A * | 11/1995 | Castro | B60R 21/08 244/122 AG |
| 5,470,103 | A * | 11/1995 | Vaillancourt | B60R 21/214 280/730.1 |
| 5,499,840 | A * | 3/1996 | Nakano | B60N 2/0705 280/730.1 |
| 5,785,347 | A * | 7/1998 | Adolph | B60R 21/01556 180/273 |
| 6,018,693 | A * | 1/2000 | Blackburn | B60R 21/01536 180/268 |
| 6,027,138 | A * | 2/2000 | Tanaka | B60N 2/002 250/559.22 |
| 6,033,017 | A * | 3/2000 | Elqadah | B60N 2/2222 297/216.1 |
| 6,123,357 | A * | 9/2000 | Hosoda | B60N 2/002 280/730.2 |
| 6,158,812 | A * | 12/2000 | Bonke | B60R 16/08 297/391 |
| 6,199,902 | B1 * | 3/2001 | Cooper | B60R 21/01532 280/734 |
| 6,237,945 | B1 * | 5/2001 | Aboud | B60R 21/18 280/730.2 |
| 6,308,917 | B1 * | 10/2001 | Ruff | B64D 25/02 244/122 AG |
| 6,315,245 | B1 * | 11/2001 | Ruff | B64D 25/02 244/122 AG |
| 6,378,898 | B1 | 4/2002 | Lewis et al. | |
| 6,428,041 | B1 * | 8/2002 | Wohllebe | B60R 21/2155 280/729 |
| 6,572,137 | B2 * | 6/2003 | Bossecker | B60R 21/207 280/730.1 |
| 6,942,248 | B2 * | 9/2005 | Breed | B60N 2/853 280/735 |
| 7,040,651 | B2 * | 5/2006 | Bossecker | B60R 21/23138 280/729 |
| 7,150,468 | B2 * | 12/2006 | Pan | B60R 21/207 280/730.1 |
| 7,207,594 | B2 * | 4/2007 | Igawa | B60R 21/206 280/730.1 |
| 7,258,188 | B2 * | 8/2007 | Chernoff | B60R 21/18 180/268 |
| 7,380,818 | B2 * | 6/2008 | Hofbeck | B60R 21/01534 280/735 |
| 7,445,284 | B2 * | 11/2008 | Gerfast | B60N 2/4221 297/216.12 |
| 7,503,583 | B2 * | 3/2009 | Muller | B60R 21/205 280/728.3 |
| 7,516,979 | B2 * | 4/2009 | Kokeguchi | B60R 21/18 280/729 |
| 7,549,672 | B2 * | 6/2009 | Sato | B60R 21/207 280/729 |
| 7,604,080 | B2 * | 10/2009 | Breed | B60N 2/0232 180/274 |
| 7,699,265 | B2 * | 4/2010 | Mastrolia | B64D 25/10 244/122 A |
| 7,726,733 | B2 * | 6/2010 | Balser | B60N 2/4235 280/730.2 |
| 7,770,921 | B2 * | 8/2010 | Mueller | B60R 21/207 280/730.2 |
| 7,878,452 | B2 * | 2/2011 | Mastrolia | B64D 25/10 244/122 A |
| 7,922,190 | B2 * | 4/2011 | Sugimoto | B60R 21/207 280/729 |
| 7,922,191 | B2 * | 4/2011 | Choi | B60R 21/233 280/729 |
| 7,926,839 | B1 * | 4/2011 | Mothaffar | B60R 22/001 280/730.1 |
| 7,942,440 | B2 * | 5/2011 | Choi | B60R 21/231 280/729 |
| 8,087,690 | B2 * | 1/2012 | Kim | B60R 21/214 280/729 |
| 8,256,796 | B2 * | 9/2012 | Loibl | B60R 21/207 280/728.2 |
| 8,393,636 | B2 * | 3/2013 | Tanaka | B60R 21/206 280/730.1 |
| 8,398,113 | B2 * | 3/2013 | Choi | B60R 21/207 280/730.1 |
| 8,485,551 | B2 * | 7/2013 | Dainese | B60R 21/207 280/730.1 |
| 8,579,321 | B2 * | 11/2013 | Lee | B60R 21/214 280/729 |
| 8,807,593 | B2 * | 8/2014 | Lee | B60R 21/233 280/730.1 |
| 8,820,830 | B2 * | 9/2014 | Lich | B60N 2/0276 297/216.13 |
| 8,985,622 | B1 * | 3/2015 | Cannon | B60R 21/231 280/730.2 |
| 9,038,948 | B2 * | 5/2015 | Ruff | B64D 25/10 244/122 AG |
| 9,156,426 | B1 * | 10/2015 | Faruque | B60R 21/207 |
| 9,238,425 | B2 * | 1/2016 | Fukawatase | B60R 21/13 |
| 9,308,883 | B1 | 4/2016 | Schneider | |
| 9,352,839 | B2 * | 5/2016 | Gehret | B60R 21/207 |
| 9,428,138 | B2 * | 8/2016 | Farooq | B60R 21/231 |
| 9,533,605 | B2 * | 1/2017 | Fujiwara | B60N 2/4279 |
| 9,533,651 | B1 * | 1/2017 | Ohno | B60R 21/23138 |
| 9,573,553 | B2 * | 2/2017 | Ko | B60R 21/207 |
| 9,707,876 | B2 * | 7/2017 | White | B60N 2/6009 |
| 9,744,932 | B1 * | 8/2017 | Faruque | B60R 21/16 |
| 9,758,127 | B1 * | 9/2017 | Farooq | B60R 22/26 |
| 9,783,155 | B2 * | 10/2017 | Kondo | B60N 2/79 |
| 9,827,876 | B2 * | 11/2017 | Madaras | B60N 2/0276 |
| 9,919,673 | B2 * | 3/2018 | Ohno | B60R 21/262 |
| 9,981,624 | B2 * | 5/2018 | Perlo | B60R 21/23138 |
| 10,077,058 | B2 * | 9/2018 | Ohmi | G05D 1/0055 |
| 10,112,570 | B2 * | 10/2018 | Barbat | B60N 2/90 |
| 10,189,431 | B2 * | 1/2019 | Yamamoto | B60R 21/207 |
| 10,189,432 | B2 * | 1/2019 | Matsushita | B60R 21/23138 |
| 10,232,814 | B2 * | 3/2019 | Gandhi | B60R 21/015 |
| 10,246,043 | B2 * | 4/2019 | Schneider | B60R 21/214 |
| 10,252,688 | B2 * | 4/2019 | Szawarski | B60N 2/0244 |
| 10,328,889 | B2 * | 6/2019 | Sugie | B60R 21/01552 |

(56) References Cited

U.S. PATENT DOCUMENTS

| | | | |
|---|---|---|---|
| 10,343,638 B2* | 7/2019 | Fukawatase | B60R 21/23138 |
| 10,471,919 B2* | 11/2019 | Faruque | B60R 21/2338 |
| 10,471,920 B2* | 11/2019 | Dry | B60R 21/2165 |
| 10,513,206 B2* | 12/2019 | Spahn | B60R 21/2338 |
| 10,518,733 B2* | 12/2019 | Dry | B60R 21/2338 |
| 10,625,704 B2* | 4/2020 | Dry | B60R 21/2338 |
| 10,632,952 B2* | 4/2020 | Markusic | B60R 21/237 |
| 10,632,958 B2* | 4/2020 | Dry | B60N 2/767 |
| 10,633,100 B2* | 4/2020 | Adams | B64D 25/10 |
| 2002/0140214 A1* | 10/2002 | Breed | E05F 15/43 280/735 |
| 2006/0214401 A1* | 9/2006 | Hirata | B60R 21/232 280/730.1 |
| 2007/0040368 A1* | 2/2007 | Manley | D03D 25/005 280/743.2 |
| 2007/0228709 A1* | 10/2007 | Khouri | B60R 21/233 280/740 |
| 2010/0213748 A1* | 8/2010 | Pedrero Iniguez | B60N 2/865 297/410 |
| 2010/0237596 A1* | 9/2010 | Sugimoto | B60R 21/26 280/743.1 |
| 2012/0007408 A1* | 1/2012 | Freienstein | B60N 2/4235 297/464 |
| 2012/0086250 A1* | 4/2012 | Stoessel | B60N 2/986 297/284.9 |
| 2012/0089303 A1* | 4/2012 | Freienstein | B60N 2/4235 701/45 |
| 2013/0015642 A1* | 1/2013 | Islam | B60R 21/231 280/730.1 |
| 2013/0093224 A1* | 4/2013 | Dainese | B60R 21/207 297/216.12 |
| 2014/0042733 A1* | 2/2014 | Fukawatase | B60R 21/0136 280/730.2 |
| 2014/0300088 A1* | 10/2014 | Fukawatase | B60R 21/08 280/729 |
| 2014/0327234 A1* | 11/2014 | Heurlin | B60N 2/2872 280/730.1 |
| 2016/0082915 A1* | 3/2016 | Madaras | B60R 21/231 297/216.2 |
| 2016/0121839 A1* | 5/2016 | Ko | B60R 21/233 280/730.1 |
| 2016/0272141 A1* | 9/2016 | Ohmura | B60R 21/0134 |
| 2016/0347272 A1* | 12/2016 | Kato | B60R 21/207 |
| 2017/0028955 A1* | 2/2017 | Ohno | B60R 21/207 |
| 2017/0057456 A1* | 3/2017 | Ohno | B60R 21/23138 |
| 2017/0057459 A1* | 3/2017 | Kondo | B60R 21/207 |
| 2017/0144622 A1* | 5/2017 | Perlo | B60R 21/233 |
| 2017/0203711 A1* | 7/2017 | Ohno | B60R 21/237 |
| 2017/0259704 A1* | 9/2017 | Madaras | B60R 21/04 |
| 2017/0259774 A1* | 9/2017 | Matsushita | B60R 21/23138 |
| 2017/0291569 A1* | 10/2017 | Sugie | B60R 21/2338 |
| 2018/0222432 A1* | 8/2018 | Schneider | B60R 21/261 |
| 2019/0016293 A1* | 1/2019 | Saso | B60R 21/23138 |
| 2019/0031132 A1* | 1/2019 | Dry | B60R 21/2338 |
| 2019/0054884 A1* | 2/2019 | Dry | B60R 21/2338 |
| 2019/0071046 A1* | 3/2019 | Dry | B60R 21/207 |
| 2019/0217803 A1* | 7/2019 | Dry | B60R 21/23138 |
| 2019/0291678 A1* | 9/2019 | Cho | B60R 21/207 |

FOREIGN PATENT DOCUMENTS

| | | |
|---|---|---|
| EP | 1193141 B1 | 11/2004 |
| FR | 2667831 A1 | 4/1992 |
| FR | 2927592 B1 | 3/2010 |
| GB | 2364674 B | 9/2003 |
| JP | 4911500 B2 | 4/2012 |

* cited by examiner

VEHICLE INCLUDING INFLATABLE ASSEMBLY SUPPORTED BY SEAT

CROSS-REFERENCE TO RELATED APPLICATIONS

The subject patent application claims priority to and all the benefits of U.S. Provisional Patent Application No. 62/641,617, which was filed on Mar. 12, 2018 and which is herein incorporated by reference in its entirety.

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

A vehicle seat assembly includes a seatback including a left lateral panel and a right lateral panel opposite the left lateral panel, a left airbag inflatable from the left lateral panel to an inflated position, a right airbag inflatable from the right lateral panel to an inflated position, a tether extending from the left lateral panel to the right lateral panel, and a sheet connected to the left airbag and the right airbag. The tether is connected to the left and right airbags.

The tether may be inflatable.

The vehicle seat assembly may further include a front airbag attached to the tether. The vehicle seat assembly may further include an inflator disposed in the seatback and fluidly connected to the tether and to the front airbag.

The front airbag may be inflatable to an inflated position, and the front airbag may be between the seatback and the sheet when the left airbag, right airbag, and front airbag are in the inflated positions.

The front airbag may be inflatable to an inflated position, and the sheet may be adjacent the front airbag when the left airbag, right airbag, and front airbag are in the inflated positions.

The front airbag may be inflatable to an inflated position, and the sheet may be adjacent the left and right airbags when the left airbag, right airbag, and front airbag are in the inflated positions.

The tether may be a first tether, and the vehicle seat assembly may further include a second tether extending from the left lateral panel to the right lateral panel and attached to the front airbag. The front airbag may be inflatable to an inflated position, and the second tether may be spaced below the first tether when the front airbag is in the inflated position.

The front airbag may be inflatable to an inflated position, and the sheet may extend from the first tether to the second tether when the front airbag is in the inflated position.

The seatback may include a front panel extending laterally between the left lateral panel and the right lateral panel, and the tether may extend across the front panel when the left airbag and the right airbag are in the inflated position.

The seatback may include a front panel extending laterally between the left lateral panel and the right lateral panel, and the sheet may extend across the front panel when the left airbag and the right airbag are in the inflated position.

The seatback may include a support portion and an airbag portion, and the airbag portion may be vertically adjustable relative to the support portion. The airbag portion may include the left lateral panel and the right lateral panel.

The airbag portion may include a channel extending from the left lateral panel to the right lateral panel, the left airbag and right airbag may be inflatable from an uninflated position to the inflated position, and the left airbag, right airbag, and tether may be disposed in the channel when the left airbag and right airbag are in the uninflated position. The seatback may include a covering extending over the airbag portion, and the covering may include a seam extending along the channel. The tether may be inflatable, and the seam may be frangible from inflation of the tether.

The vehicle seat assembly may further include a seat bottom coupled to the seatback, and a rotational mechanism coupled to the seat bottom and connectable to a floor, and the rotational mechanism may be rotatable about an axis transverse to the floor.

A vehicle includes a floor and a seat assembly. The seat assembly includes a seat bottom, a seatback coupled to the seat bottom, a rotational mechanism coupled to the seat bottom and the floor and rotatable about an axis transverse to the floor, a left airbag, a right airbag, and tether, and a sheet connected to the left airbag and the right airbag. The seatback includes a left lateral panel and a right lateral panel opposite the left lateral panel. The left airbag is inflatable from the left lateral panel to an inflated position. The right airbag is inflatable from the right lateral panel to an inflated position. The tether extends from the left lateral panel to the right lateral panel, and the tether is connected to the airbags.

A vehicle seat assembly 30 in a vehicle 32 includes a seatback 34 including a left lateral panel 36 and a right lateral panel 38 opposite the left lateral panel 36, a left airbag 40 inflatable from the left lateral panel 36 to an inflated position, a right airbag 42 inflatable from the right lateral panel 38 to an inflated position, a first tether 44 extending from the left lateral panel 36 to the right lateral panel 38, and a sheet 46 connected to the left airbag 40 and the right airbag 42. The first tether 44 is connected to the left and right airbags 40, 42. The vehicle seat assembly 30 may include a front airbag 48 attached to the first tether 44.

The vehicle seat assembly 30 includes the left and right airbags 40, 42 and the front airbag 48 to retain an occupant in a seat 50 during a sudden deceleration of the vehicle 32, e.g., during a vehicle impact. The sheet 46 extends adjacent the airbags 40, 42, 48 along an outside of the airbags 40, 42, 48, and the sheet 46 is positioned to retain an occupant having momentum directed between the airbags 40, 42, 48 during an impact. The vehicle seat assembly 30 increases the likelihood that the occupant is retained in the seat 50 regardless of the direction of the impact and the direction the seat 50 faces. The seat 50 may thus be designed to rotate within the vehicle 32, providing more convenience for the occupant, particularly if the vehicle 32 is an autonomous vehicle.

Figure 1:
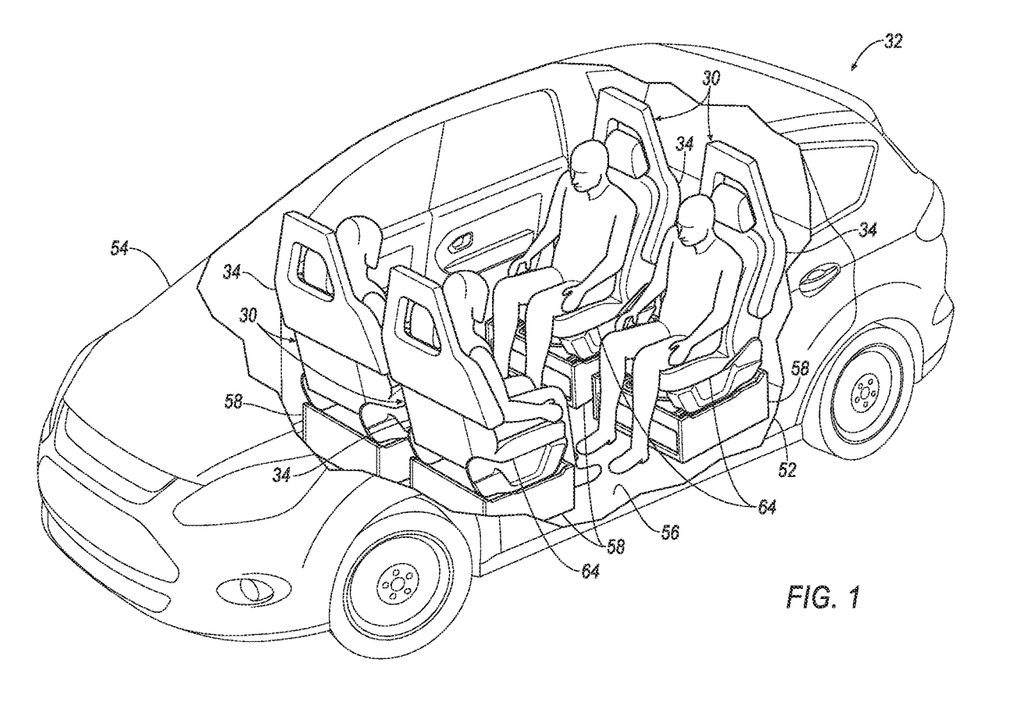
FIG. 1 is a perspective view of an example vehicle with a passenger cabin exposed for illustration.

With reference to FIG. 1, the vehicle 32 may be an autonomous vehicle. A computer (not shown) can be configured to operate the vehicle 32 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

The vehicle 32 includes a passenger cabin 52. The passenger cabin 52 houses occupants, if any, of the vehicle 32. The passenger cabin 52 may be surrounded and/or defined by a body 54 of the vehicle 32. A floor 56 may define a bottom of the passenger cabin 52.

The vehicle 32 may include one or more seats 50 for occupants of the vehicle 32. The seat or seats 50 may be supported on the floor 56. In examples in which the vehicle 32 includes multiple seats 50, the seats 50 may be substantially identical. Each seat 50 may be a bucket seat, as shown in the Figures, a bench seat, or another type of seat. Each seat 50 defines a front direction as a direction faced by an occupant sitting in the seat 50.

The floor 56 may rotatably support the seat 50 such that the seat 50 is rotatable about an axis transverse to the floor 56. For example, the seat 50 may be rotatably coupled to the floor 56 via a rotational mechanism 58 configured to rotatably support the seat 50 on the floor 56 of the vehicle 32 such that the seat 50 is rotatable about an axis transverse to the floor 56. The rotational mechanism 58, for example, may include a pedestal 60 connected to one of the seat 50 and the floor 56, and a bearing 62 connected to the other of the seat 50 and the floor 56 and rotatably receiving the pedestal 60. In examples where the vehicle 32 includes multiple seats 50, the seats 50 may each be rotatable relative to each other about a vertical axis relative to the passenger cabin 52. The seat 50 may face a vehicle-forward direction, a vehicle-rearward direction, or any direction in between. Whichever direction the seat 50 is facing is the forward direction relative to the seat 50.

Figure 2:
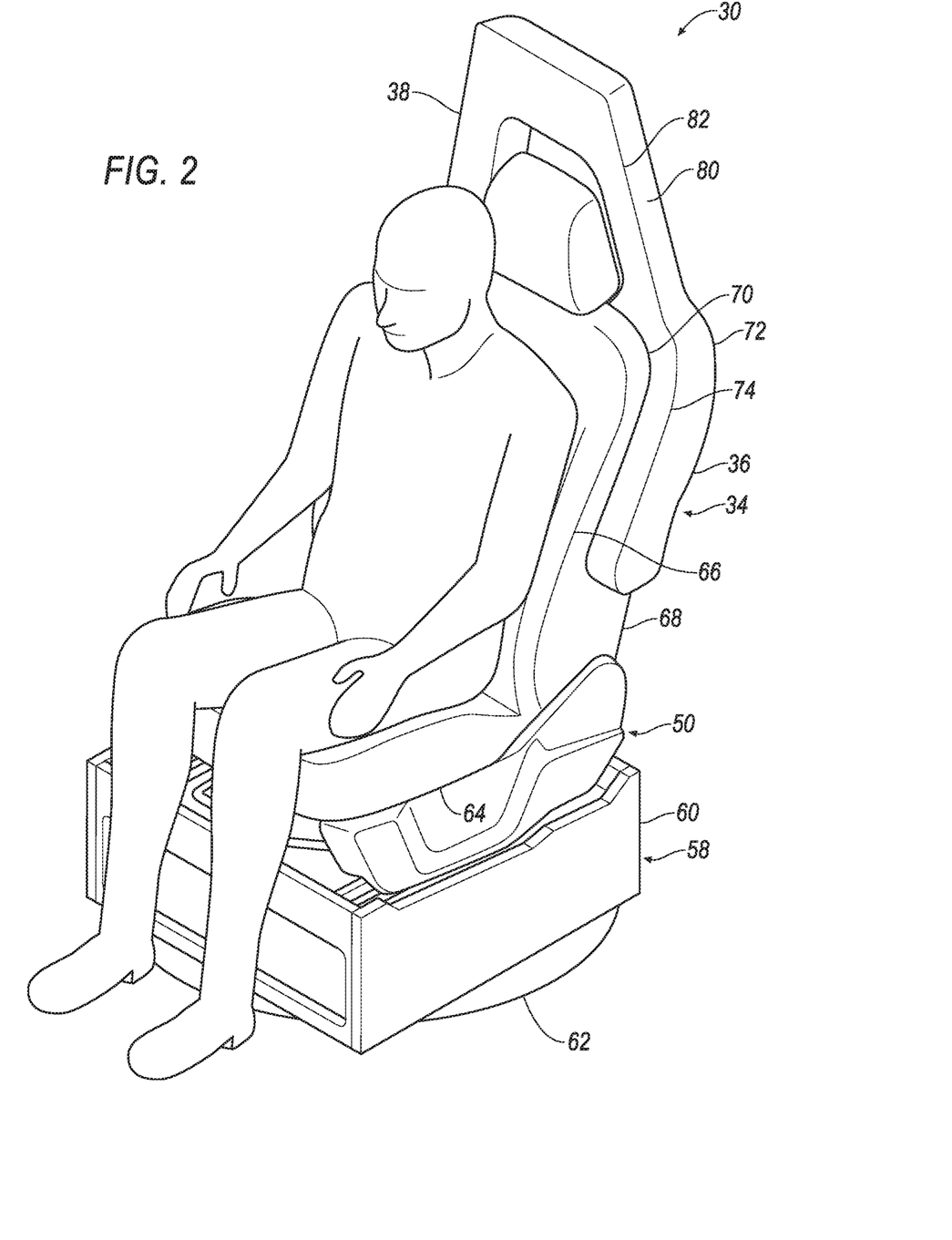
FIG. 2 is a perspective view of a seat of the vehicle of FIG. 1.

With reference to FIG. 2, the seatback 34 may be supported by a seat bottom 64 and may be stationary or movable relative to the seat bottom 64. For example, the seatback 34 may be raised and lowered relative to the seat bottom 64. In addition, or in the alternative, the seatback 34 and/or the seat bottom 64 may be adjustable in multiple degrees of freedom relative to each other. Specifically, the seatback 34 and/or the seat bottom 64 may themselves be adjustable, in other words, have adjustable components within the seatback 34 and/or the seat bottom 64, and/or may be adjustable relative to each other.

The seatback 34 includes a front panel 66 that the occupant contacts when sitting in the seat 50, a back panel 68 facing the opposite direction as the front panel 66, and a left lateral panel 36 and a right lateral panel 38 facing laterally. The right lateral panel 38 is disposed opposite the left lateral panel 36 and faces the opposite direction as the left lateral panel 36. The front panel 66 and the back panel 68 extend laterally between the left lateral panel 36 and the right lateral panel 38.

The seatback 34 may include a support portion 70 and an airbag portion 72. The support portion 70 may be positioned to provide support to a back of an occupant sitting in the seat 50. The support portion 70 may include the front panel 66. The airbag portion 72 may be vertically adjustable relative to the support portion 70; i.e., an occupant may be able to raise or lower the airbag portion 72 relative to the support portion 70, e.g., higher for a taller occupant and lower for a shorter occupant.

The airbag portion 72 may be disposed laterally and/or above the support portion 70. The airbag portion 72 may include a forward surface 74 generally shaped like an arch or upside-down-U. The forward surface 74 of the airbag portion 72 may be shaped to expose the front panel 66 of the support portion 70. The airbag portion 72 may include the left lateral panel 36 and the right lateral panel 38.

Figure 3:
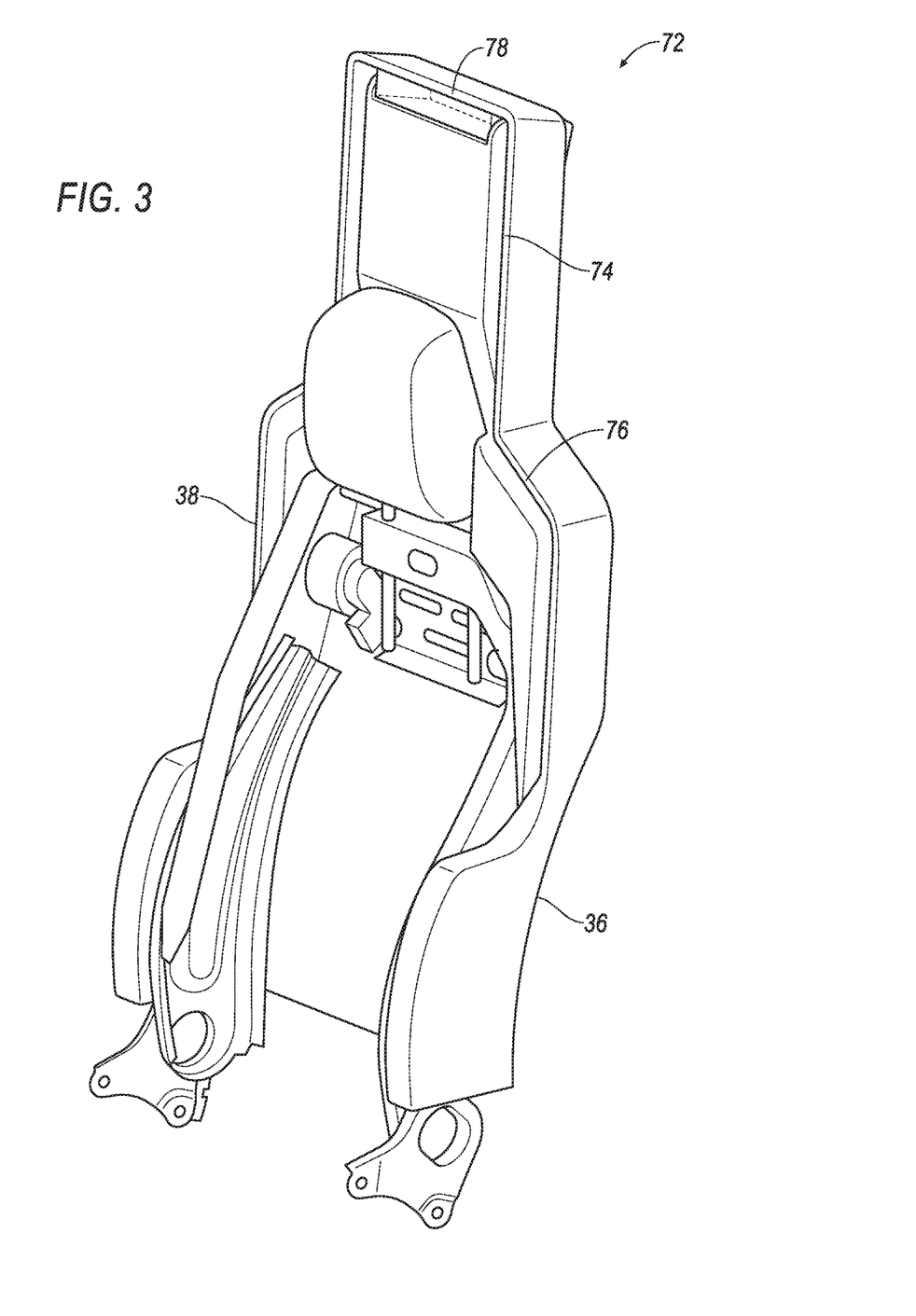
FIG. 3 is a perspective view of an airbag portion of a seatback of the seat of FIG. 2 with a covering removed for illustration.

With reference to FIG. 3, the airbag portion 72 includes a channel 76. The airbags 40, 42, 48 may be coupled to the airbag portion 72. For example, the airbags 40, 42, 48 in an uninflated position may be disposed in the channel 76. The channel 76 may generally be shaped like an arch or upside-down-U, like the forward surface 74 of the airbag portion 72. The channel 76 may be elongated along a periphery of the forward surface 74 of the airbag portion 72. The channel 76 may be sized to receive the first tether 44, the left airbag 40, the right airbag 42, and the front airbag 48 in uninflated positions. The channel 76 may include a compartment 78 at a top of the airbag portion 72. The compartment 78 may be sized to receive the front airbag 48 in the uninflated position.

The seatback 34 may include a covering 80 extending over the support portion 70 and/or the airbag portion 72. The covering 80 may be formed of cloth, leather, faux leather, or any other suitable material. The covering 80 may be stitched in panels around the support portion 70 and/or the airbag portion 72.

With reference to FIG. 2, the covering 80 of the airbag portion 72 may include a seam 82 extending along the channel 76. The first tether 44 in the uninflated position may extend beneath and substantially parallel to the seam 82. The seam 82 is frangible relative to the rest of the covering 80, i.e., tears or separates at a lower tensile stress than the tensile stress at which the rest of the covering 80 tears or separates. For example, the seam 82 may be a series of perforations, may be a line of material thinner than the rest of the covering 80, etc. The seam 82 may be frangible from inflation of the first tether 44; i.e., the force of inflation of the first tether 44 may be greater than a yielding force of the seam 82.

Figure 4:
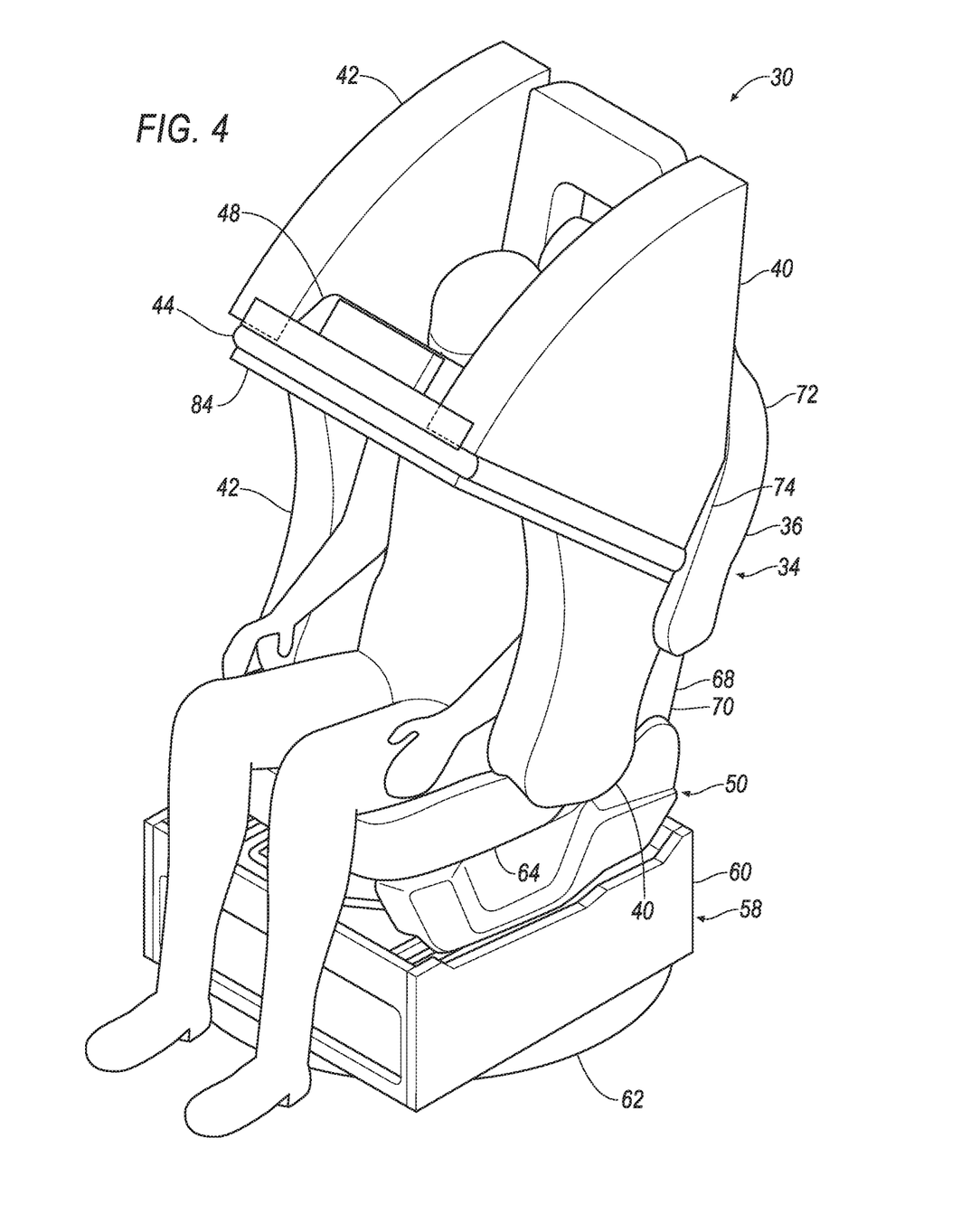
FIG. 4 is a perspective view of the seat of FIG. 2 with a first tether and left and right airbags in an inflated position and a front airbag in an uninflated position.
Figure 5:
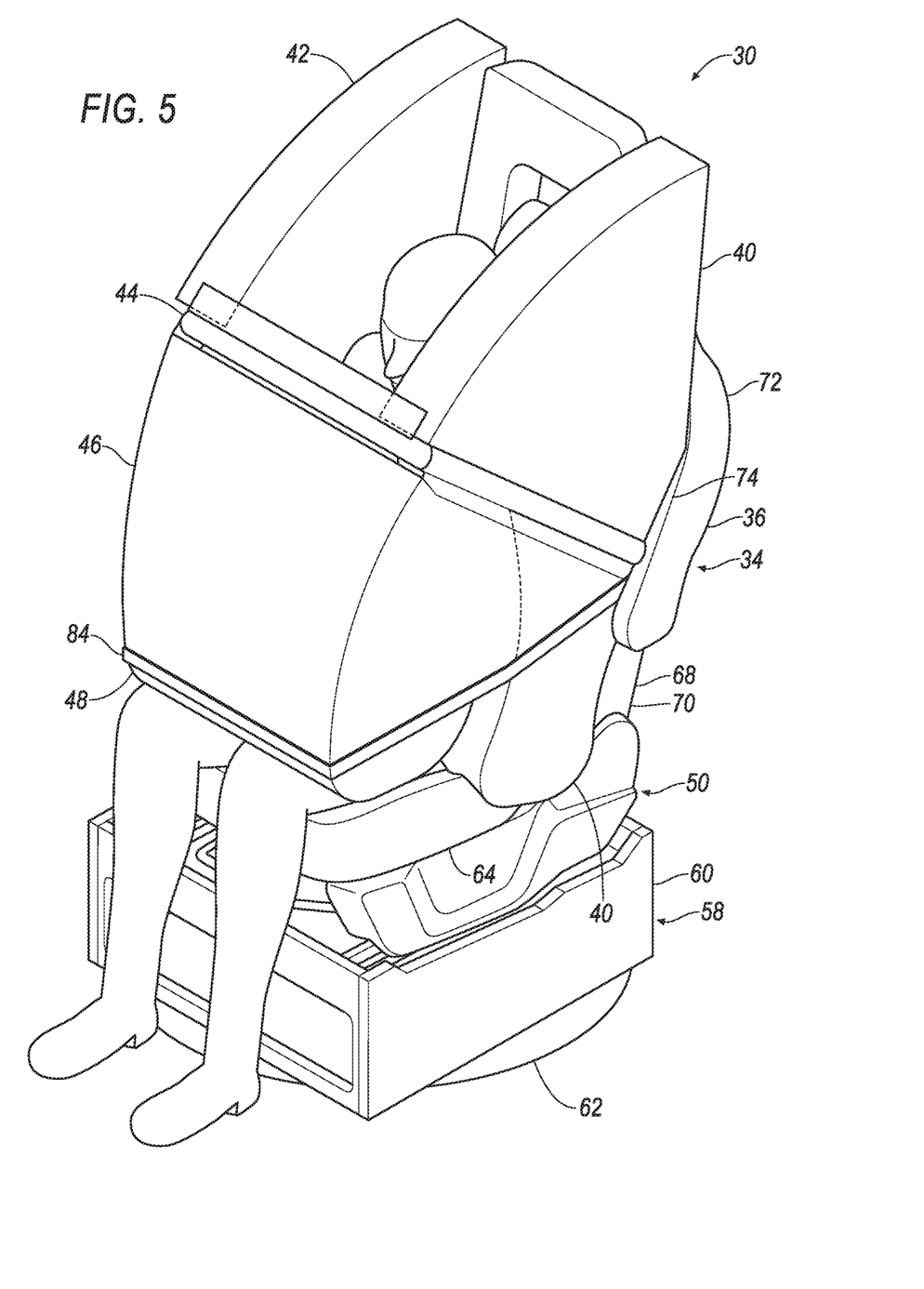
FIG. 5 is a perspective view of the seat of FIG. 2 with the first tether, the right and left airbags, and the front airbag in the inflated position.

With reference to FIG. 4, the seatback 34, e.g., the airbag portion 72, supports the left airbag 40 and the right airbag 42. The left and right airbags 40, 42 are supported on opposite sides of the occupant, i.e., the left airbag 40 on the left lateral panel 36 of the seatback 34 and the right airbag 42 on the right lateral panel 38 of the seatback 34. The left airbag 40 and right airbag 42 are inflatable from the left lateral panel 36 and the right lateral panel 38, respectively. The left and right airbags 40, 42 are inflatable from the uninflated position, as shown in FIG. 2, to the inflated position, as shown in FIGS. 4 and 5. In the uninflated position, the left and right airbags 40, 42 may be disposed, e.g., folded, e.g., in a zig-zag pattern, in the channel 76 of the airbag portion 72. In the inflated position, the left and right airbags 40, 42 may extend forward from the seatback 34 and may extend vertically from hips to shoulders of an occupant, e.g., an occupant of 50th-percentile stature, sitting in the seat 50.

The first tether 44 may be movable from an undeployed position inside the seatback 34, e.g., in the channel 76, as shown in FIG. 2, to a deployed position extending across the front panel 66 of the seatback 34, as shown in FIGS. 4 and 5. The first tether 44 may be disposed in the channel 76 when the left airbag 40 and the right airbag 42 are in the uninflated position, and the first tether 44 may extend across the front panel 66 when the left airbag 40 and the right airbag 42 are in the inflated position. The first tether 44 in the deployed position may extend in front of a location of a head or shoulders of an occupant, e.g., an occupant of 50th-percentile stature, sitting in the seat 50. The first tether 44 may be inflatable, and the undeployed position of the first tether 44 may be an uninflated position, and the deployed position of the first tether 44 may be an inflated position. The first tether 44 extends across the front panel 66 of the seatback 34 when in the inflated position. When in the inflated position, the first tether 44 extends from the left lateral panel 36 to the right lateral panel 38, outside the left and right airbags 40, 42. The first tether 44 may be connected, e.g., stitched or adhered, to the left and right airbags 40, 42, e.g., to a forward, upper portion of the left airbag 40 and of the right airbag 42. Alternatively, the first tether 44 may formed of the same panels as the left and right airbags 40, 42 while still being a distinct chamber from the left and right airbags 40, 42. When the left and right airbags 40, 42 inflate, the left and right airbags 40, 42 pull the first tether 44 forward.

The first tether 44 may be formed of thermoplastic elastomer. A thermoplastic elastomer has both thermoplastic and elastomeric properties. A thermoplastic material becomes pliable above a particular temperature and solidifies upon cooling, and an elastomer generally has a low Young's modulus and a high failure strain. Types of TPEs include styrenic block copolymers, thermoplastic olefins, elastomeric alloys, thermoplastic polyurethanes, thermoplastic copolyesters, and thermoplastic polyamides. The material forming the first tether 44 may be solid, in other words, not a woven fabric. Alternatively, the first tether 44 may be formed of the same material as the airbags 40, 42, 48.

With reference to FIG. 5, the front airbag 48 may be attached, e.g., stitched or adhered, to the first tether 44. The front airbag 48 may be fluidly connected to the first tether 44, and, when inflating, the front airbag 48 may receive inflation medium via the first tether 44. The front airbag 48 is inflatable from an uninflated position, as shown in FIGS. 2 and 4, to an inflated position, as shown in FIG. 5. In the uninflated position, the front airbag 48 may be disposed, e.g., folded, e.g., in a zig-zag pattern, in the channel 76, e.g., the compartment 78, of the airbag portion 72 of the seatback 34, as shown in FIG. 2. While inflating, the left and right airbags 40, 42 may pull the front airbag 48 forward via the first tether 44 while the front airbag 48 is still in the uninflated position, as shown in FIG. 4. The front airbag 48 in the uninflated position may be contained, e.g., in plastic shrink-wrap. In the inflated position, the front airbag 48 is disposed in front of the front panel 66 of the seatback 34, as shown in FIG. 5. In the inflated position, the front airbag 48 may extend from hips or belly to shoulders or head, as well as from left shoulder to right shoulder, of an occupant, e.g., an occupant of 50th-percentile stature, sitting in the seat 50. When the airbags 40, 42, 48 are in the inflated positions, the front airbag 48 is disposed between the seatback 34, e.g., the front panel 66, and the sheet 46.

The airbags 40, 42, 48 may be formed of any suitable airbag material, for example, a woven polymer. For example, the airbags 40, 42, 48 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

A second tether 84 extends from the left lateral panel 36 to the right lateral panel 38. The second tether 84 is attached, e.g., stitched, to the front airbag 48. The second tether 84 may be disconnected from, i.e., not directly connected to, the first tether 44 and the left and right airbags 40, 42. While inflating, the left and right airbags 40, 42 may pull the second tether 84 forward via the front airbag 48 and the first tether 44, and while inflating, the front airbag 48 may pull the second tether 84 downward. The second tether 84 may be spaced below the first tether 44 when the front airbag 48 is in the inflated position. When the front airbag 48 is in the inflated position, the second tether 84 may extend in front of the hips or belly of an occupant, e.g., an occupant of 50th-percentile stature, sitting in the seat 50. The second tether 84 may be noninflatable. The second tether 84 may be formed of fabric, e.g., the same material as the airbags 40, 42, 48.

The sheet 46 extends from the first tether 44 to the second tether 84. The sheet 46 is connected to the left airbag 40 and the right airbag 42, either directly by, e.g., stitching, or indirectly via the first tether 44, the second tether 84, and/or the front airbag 48. The sheet 46 is movable from an undeployed position, as shown in FIG. 2, to a deployed position, as shown in FIG. 5. The sheet 46 in the undeployed position is disposed, e.g., folded, e.g., in a zig-zag pattern, in the channel 76 of the airbag portion 72 of the seatback 34. When the left and right airbags 40, 42 inflate, the sheet 46 is pulled forward, and when the front airbag 48 inflates, the sheet 46 is unfolded downward, maybe via the second tether 84. The sheet 46 is in the deployed position when the airbags 40, 42, 48 are in the inflated positions. The sheet 46 in the deployed position may be adjacent the front airbag 48 and the left and right airbags 40, 42. The sheet 46 in the deployed position may extend from the first tether 44 to the second tether 84 and in front of the front airbag 48 from the left airbag 40 to the right airbag 42. The sheet 46 in the deployed position extends across the front panel 66. The sheet 46 may be formed of fabric, e.g., the same material as the airbags 40, 42, 48.

Figure 6:
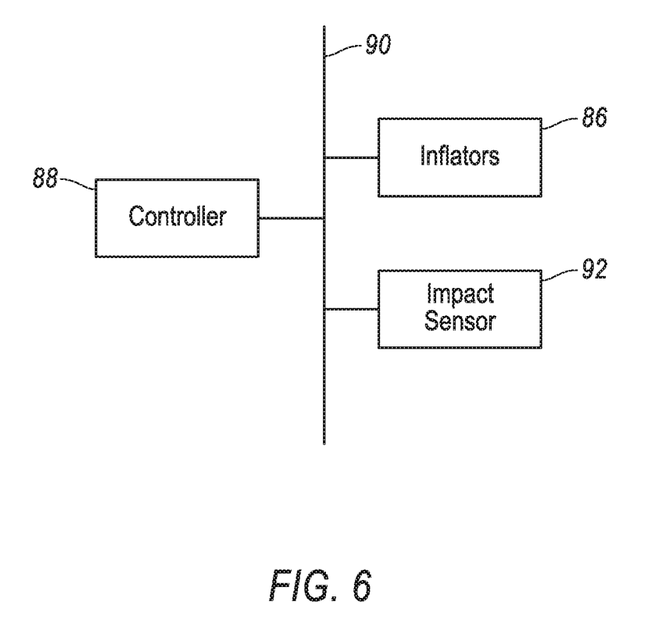
FIG. 6 is a block diagram of a control system for the seat of FIG. 2.

With reference to FIG. 6, one or more inflators 86 are disposed in the seatback 34. The inflators 86 may be fluidly connected to the first tether 44 and to the airbags 40, 42, 48. Upon receiving a signal from, e.g., a controller 88, the inflators 86 may inflate the first tether 44 and the airbags 40, 42, 48 with an inflatable medium, such as a gas. The inflators 86 may be, for example, pyrotechnic inflators that use a chemical reaction to drive inflation medium to the first tether 44 and the airbags 40, 42, 48. The inflators 86 may be of any suitable type, for example, cold-gas inflators.

The controller 88 is a microprocessor-based computer. The controller 88 includes a processor, memory, etc. The memory of the controller 88 includes memory for storing instructions executable by the processor as well as for electronically storing data and/or databases. The controller 88 may be, e.g., a restraint control module, which may be in communication with and may control seatbelts in the vehicle 32, among other functions. The controller 88 may be the same computer used for autonomous operation or a different computer.

The controller 88 may transmit and receive data through a communications network 90 such as a controller area network (CAN) bus, Ethernet, WiFi, Local Interconnect Network (LIN), onboard diagnostics connector (OBD-II), and/or by any other wired or wireless communications network. The controller 88 may be communicatively coupled to the inflators 86, an impact sensor 92, and other components via the communications network 90.

The impact sensor 92 is adapted to detect an impact to the vehicle 32. The impact sensor 92 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 92 may be located at numerous points in or on the vehicle 32.

In the event of an impact, the impact sensor 92 may detect the impact and transmit a signal through the communications network 90 to the controller 88. The controller 88 may transmit a signal through the communications network 90 to the inflators 86. The inflators 86 may discharge and inflate the first tether 44 and the airbags 40, 42, 48. Specifically, the inflators 86 may inflate the first tether 44, the left and right airbags 40, 42, and the front airbag 48 in sequence. The inflators 86 may first inflate the first tether 44, breaking open the seam 82 of the covering 80. The inflators 86 may next inflate the left and right airbags 40, 42, and the left and right airbags 40, 42 may pull the first tether 44, the front airbag 48, the second tether 84, and the sheet 46 forward. The inflators 86 may finally inflate the front airbag 48, pulling the second tether 84 down and unfolding the sheet 46. If the occupant has momentum forward relative to the seat 50, the front airbag 48 may restrain the occupant and provide cushioning. If the occupant has momentum left or right relative to the seat 50, the left airbag 40 or right airbag 42 may restrain the occupant and provide cushioning. If the occupant has momentum diagonally between forward and left or right relative to the seat 50, the sheet 46 may prevent the occupant from slipping between front airbag 48 and the left airbag 40 or right airbag 42 while the airbags 40, 42, 48 provide cushioning. If the occupant has momentum rearward relative to the seat 50, the airbags 40, 42, 48 and the sheet 46 may restrain the occupant and provide cushioning during a rebound from the impact.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A vehicle seat assembly comprising:
   a seatback including a left lateral panel and a right lateral panel opposite the left lateral panel;
   a left airbag inflatable from the left lateral panel to an inflated position;
   a right airbag inflatable from the right lateral panel to an inflated position;
   a tether extending from the left lateral panel to the right lateral panel, the tether connected to the left and right airbags;
   a sheet connected to the left airbag and the right airbag; and
   a front airbag attached to the tether;
   wherein the front airbag is inflatable to an inflated position; and
   the front airbag is between the seatback and the sheet when the left airbag, right airbag, and front airbag are in the inflated positions.

2. The vehicle seat assembly of claim 1, wherein the tether is inflatable.

3. The vehicle seat assembly of claim 1, further comprising an inflator disposed in the seatback and fluidly connected to the tether and to the front airbag.

4. The vehicle seat assembly of claim 1, wherein the front airbag is inflatable to an inflated position, and the sheet is adjacent the front airbag when the left airbag, right airbag, and front airbag are in the inflated positions.

5. The vehicle seat assembly of claim 1, wherein the front airbag is inflatable to an inflated position, and the sheet is adjacent the left and right airbags when the left airbag, right airbag, and front airbag are in the inflated positions.

6. The vehicle seat assembly of claim 1, wherein the tether is a first tether, the vehicle seat assembly further comprising a second tether extending from the left lateral panel to the right lateral panel and attached to the front airbag.

7. The vehicle seat assembly of claim 6, wherein the front airbag is inflatable to an inflated position, and the second tether is spaced below the first tether when the front airbag is in the inflated position.

8. The vehicle seat assembly of claim 6, wherein the front airbag is inflatable to an inflated position, and the sheet extends from the first tether to the second tether when the front airbag is in the inflated position.

9. The vehicle seat assembly of claim 1, wherein the seatback includes a front panel extending laterally between the left lateral panel and the right lateral panel, and the tether extends across the front panel when the left airbag and the right airbag are in the inflated position.

10. The vehicle seat assembly of claim 1, wherein the seatback includes a front panel extending laterally between the left lateral panel and the right lateral panel, and the sheet extends across the front panel when the left airbag and the right airbag are in the inflated position.

11. The vehicle seat assembly of claim 1, wherein the seatback includes a support portion and an airbag portion, and the airbag portion is vertically adjustable relative to the support portion.

12. The vehicle seat assembly of claim 11, wherein the airbag portion includes the left lateral panel and the right lateral panel.

13. The vehicle seat assembly of claim 11, wherein the airbag portion includes a channel extending from the left lateral panel to the right lateral panel, the left airbag and right airbag are inflatable from an uninflated position to the inflated position, and the left airbag, right airbag, and tether are disposed in the channel when the left airbag and right airbag are in the uninflated position.

14. The vehicle seat assembly of claim 13, wherein the seatback includes a covering extending over the airbag portion, and the covering includes a seam extending along the channel.

15. The vehicle seat assembly of claim 14, wherein the tether is inflatable, and the seam is frangible from inflation of the tether.

16. The vehicle seat assembly of claim 1, further comprising a seat bottom coupled to the seatback, and a rotational mechanism coupled to the seat bottom and connectable to a floor, the rotational mechanism rotatable about an axis transverse to the floor.

17. A vehicle comprising:
a floor; and
a seat assembly including:
 a seat bottom;
 a seatback coupled to the seat bottom, the seatback including a left lateral panel and a right lateral panel opposite the left lateral panel;
 a rotational mechanism coupled to the seat bottom and the floor and rotatable about an axis transverse to the floor;
 a left airbag inflatable from the left lateral panel to an inflated position;
 a right airbag inflatable from the right lateral panel to an inflated position;
 a tether extending from the left lateral panel to the right lateral panel, the tether connected to the airbags;
 a sheet connected to the left airbag and the right airbag; and
 a front airbag attached to the tether;
wherein the front airbag is inflatable to an inflated position; and
the front airbag is between the seatback and the sheet when the left airbag, right airbag, and front airbag are in the inflated positions.

* * * * *